(12) United States Patent
Lin et al.

(10) Patent No.: US 12,246,472 B2
(45) Date of Patent: Mar. 11, 2025

(54) MOLD CORE STRUCTURE

(71) Applicant: RAYSPERT PRECISION INDUSTRIAL INC, Tainan (TW)

(72) Inventors: Shun Fu Lin, Tainan (TW); Yu-Chang Su, Tainan (TW)

(*) Notice: Subject to any disclaimer, the term of this patent is extended or adjusted under 35 U.S.C. 154(b) by 0 days.

(21) Appl. No.: 18/668,180

(22) Filed: May 19, 2024

(65) Prior Publication Data

US 2024/0300147 A1    Sep. 12, 2024

Related U.S. Application Data

(62) Division of application No. 17/829,374, filed on Jun. 1, 2022, now Pat. No. 12,017,386.

(30) Foreign Application Priority Data

Mar. 18, 2022    (TW) .................................. 111110068

(51) Int. Cl.
| | | |
|---|---|---|
| *B29C 45/34* | (2006.01) | |
| *B29C 33/04* | (2006.01) | |
| *B29C 33/10* | (2006.01) | |
| *B29C 33/38* | (2006.01) | |
| *B33Y 80/00* | (2015.01) | |

(52) U.S. Cl.
CPC .............. *B29C 33/10* (2013.01); *B29C 33/04* (2013.01); *B29C 33/3814* (2013.01); *B29C 45/345* (2013.01); *B33Y 80/00* (2014.12)

(58) Field of Classification Search
CPC .......................... B29C 33/3814; B29C 45/345
See application file for complete search history.

(56) References Cited

U.S. PATENT DOCUMENTS

| | | | | |
|---|---|---|---|---|
| 2008/0277837 | A1* | 11/2008 | Liu ...................... | B29C 45/345 264/497 |
| 2021/0308919 | A1* | 10/2021 | Lin ...................... | B33Y 80/00 |

* cited by examiner

*Primary Examiner* — James Sanders
(74) *Attorney, Agent, or Firm* — Bruce Stone LLP; Joseph A. Bruce

(57) ABSTRACT

Provided is a mold core structure, which is arranged on a mold. The mold core structure includes a mold core body, which is a solid body made of three-dimensional printing, wherein one side of the mold core body is provided with a molding part, which is combined with an internal structure of the mold to form a cavity, there is a conformal air duct inside the mold core body, the conformal air duct has at least one main air duct and a plurality of secondary air ducts, the main air duct has a first end and a second end, the first end is located on one side of the mold core body, and connected to an external pneumatic control device, the pneumatic control device controls air to enter or exit the cavity through the conformal air duct, the second end thereof is located inside the mold core body, a path of the main air duct is freely wound around the molding part between the first end and the second end, one end of each of the secondary air ducts is communicated with the main air duct, and another end thereof is communicated with the molding part and disposed towards an ejection direction of a finished product. Accordingly, the finished product is released from the mold by controlling the air through the pneumatic control device.

4 Claims, 7 Drawing Sheets

MOLD CORE STRUCTURE

CROSS-REFERENCE TO RELATED APPLICATION(S)

This application is a divisional of U.S. application Ser. No. 17/829,374 filed on Jun. 1, 2022, the full disclosures of which are hereby incorporated by reference.

BACKGROUND OF THE INVENTION

1. Field of the Invention

The present disclosure relates to a mold core structure, and particularly relates to a conformal air duct inside a mold core structure, and a structure that improves the air-entraining phenomenon by means of controlling the intake and exhaust air to release the finished product and control the mold temperature.

2. The Prior Arts

In the injection molding process, after the plastic is melted and injection molded, it will first be cooled in the cavity of the mold to solidify, and then a finished product will be ejected from the cavity of the mold through a thimble. Due to the force of the ejection, a square or round thimble mark will be left on the finished product. In addition, in some molds, an air pin (pneumatic thimble) structure is disposed in the mold core to eject the finished product. It mainly uses a circular air valve to control air blowing, and uses the principle of air diffusion to make the finished product fall off in an instant. However, due to the size and structure of the mold core, the distribution of the air pins is limited such that the air must be ejected at high pressure. When the air is ejected from one side under high pressure and ejected from the other side, it will impact the finished product and cause the formation of spray marks. Consequently, circular ejection marks are also left when ejected. There is a difference between the temperature of the air blown by the air valve and the temperature of the finished product in the cavity, thereby causing uneven marks on the finished product. When the plastic material is a material with high viscosity such as silicone and rubber, the surface of the finished product is easy to adhere to the mold cavity, which makes demolding difficult after molding.

Moreover, when the molten plastic is injected into the mold, it will compress the air in the cavity, thereby causing the pressure in the cavity to increase and increasing the resistance to flow. When the mold exhaust is poor and the molten plastic is injected into the end section, the flow resistance will increase. Due to the excessive compression of hot air, there is a shortage of material at the end of the finished product, and the plastic flow envelops the air, causing the finished product to have voids or bubbles, shrinkage, depressions, cracks, charring, etc. Although the existing mold is corresponding to the exhaust groove at the end of the cavity, the improvement is still limited.

Further, when the molten plastic fills the cavity, the heat will be transferred to the mold wall by thermal conduction, which will cause the mold temperature to change. Existing molds use cooling water channels to respond to changes in mold temperature, but the cooling water channels still have the problem of not reaching the dead corners of the finished product or the heat accumulation of the mold core, resulting in uneven temperature distribution of the mold core. The finished product is warped due to thermal stress caused by temperature difference. In addition, the accumulated heat of the mold core will also change the flow rate of the injected molten plastic, which will affect the yield of the finished product and the production cycle. In order to maintain the fluidity of the molten plastic, the mold cavity must maintain a certain temperature, and while waiting for the finished product to be cooled down, the mold must be cooled down again, thereby consuming considerable energy under the switching of rapid heating and rapid cooling.

SUMMARY OF THE INVENTION

In view of the shortcomings and deficiencies of the prior art, the main objective of the present disclosure is to solve the problem of traces produced by the existing mold structure during the demolding process, the problem of poor exhaust in the manufacturing process and the problem of heat accumulation of the mold core.

In order to achieve the above objective, the present disclosure provides a mold core structure, which is arranged on a mold. The mold core structure mainly includes a mold core body, which is a solid body made of three-dimensional printing, wherein one side of the mold core body is provided with a molding part, which is combined with an internal structure of the mold to form a cavity, there is a conformal air duct inside the mold core body, the conformal air duct has at least one main air duct and a plurality of secondary air ducts, the main air duct has a first end and a second end, the first end is located on one side of the mold core body, and connected to an external pneumatic control device, the pneumatic control device controls air to enter or exit the cavity through the conformal air duct, the second end thereof is located inside the mold core body, a path of the main air duct is freely wound around the molding part between the first end and the second end, one end of each of the secondary air ducts is communicated with the main air duct, and another end thereof is communicated with the molding part and disposed towards an ejection direction of a finished product.

In order to achieve the above objective, the present disclosure provides a mold core structure, which is arranged on a mold. The mold core structure mainly includes a mold core body, which is made by three-dimensional printing and includes a solid zone and an air-permeable zone, the solid zone is a solid body, a three-dimensional printing filling density of the air-permeable zone is lower than the filling density of the solid zone such that the air-permeable zone is filled with interconnected micropores, one side of the mold core body is provided with a molding part, which is combined with an internal structure of the mold to form a cavity, a range of the molding part includes the solid zone and the air-permeable zone, there is a conformal air duct inside the mold core body, the conformal air duct has at least one main air duct and a plurality of secondary air ducts, the main air duct has a first end and a second end, the first end is located on one side of the mold core body and connected to an external pneumatic control device, the pneumatic control device controls air to enter or exit the cavity through the conformal air duct, the second end thereof is located inside the mold core body, a path of the main air duct is freely wound around the molding part between the first end and the second end, one end of each of the secondary air ducts is communicated with the main air duct, another end thereof is communicated with the molding part and disposed towards an ejection direction of a finished product, and a surrounding range of the conformal air duct includes the air-permeable zone and the solid zone. Alternatively, the surrounding range of the conformal air duct only includes the air-permeable zone.

As such, according to the arrangement of the mold core body, before the molten plastic is injected into the cavity, the pneumatic control device extracts the air inside the cavity and discharges it to the outside of the mold to reduce flow resistance. When the finished product is waiting to be cooled down in the cavity, through the pneumatic control device, the air diffused through the conformal air duct so as to adjust the temperature of the mold core body, shorten the cooling time and solve the problem of heat accumulation of the mold core. When the finished product is to be demolded from the cavity, the pneumatic control device controls the air to enter the cavity through the conformal air duct. The permeated air is ejected from each of the secondary air ducts to complete the separation of the finished product, thereby reducing the problem of traces from demolding.

DETAILED DESCRIPTION OF THE PREFERRED EMBODIMENT

The following is a specific embodiment to illustrate the implementation of the present disclosure. Persons skilled in the art can easily understand the other advantages and effects of the present disclosure from the disclosure in the specification.

Figure 1:
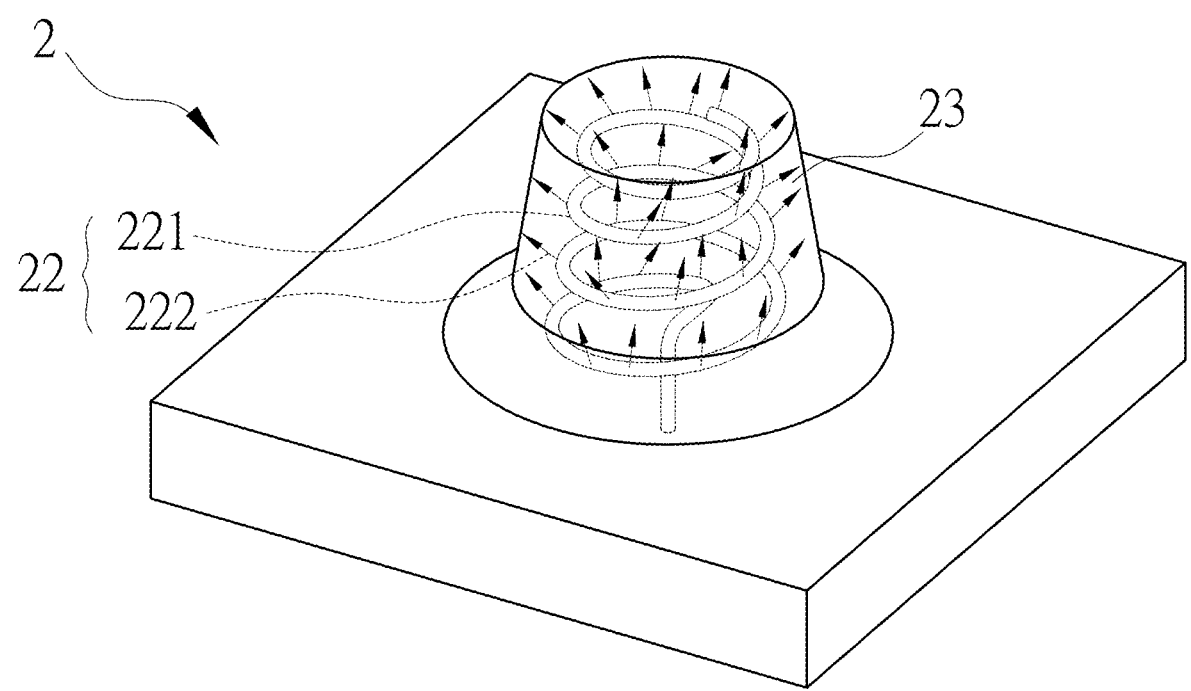
FIG. 1 is a schematic diagram showing a first embodiment of the present disclosure.
Figure 2:
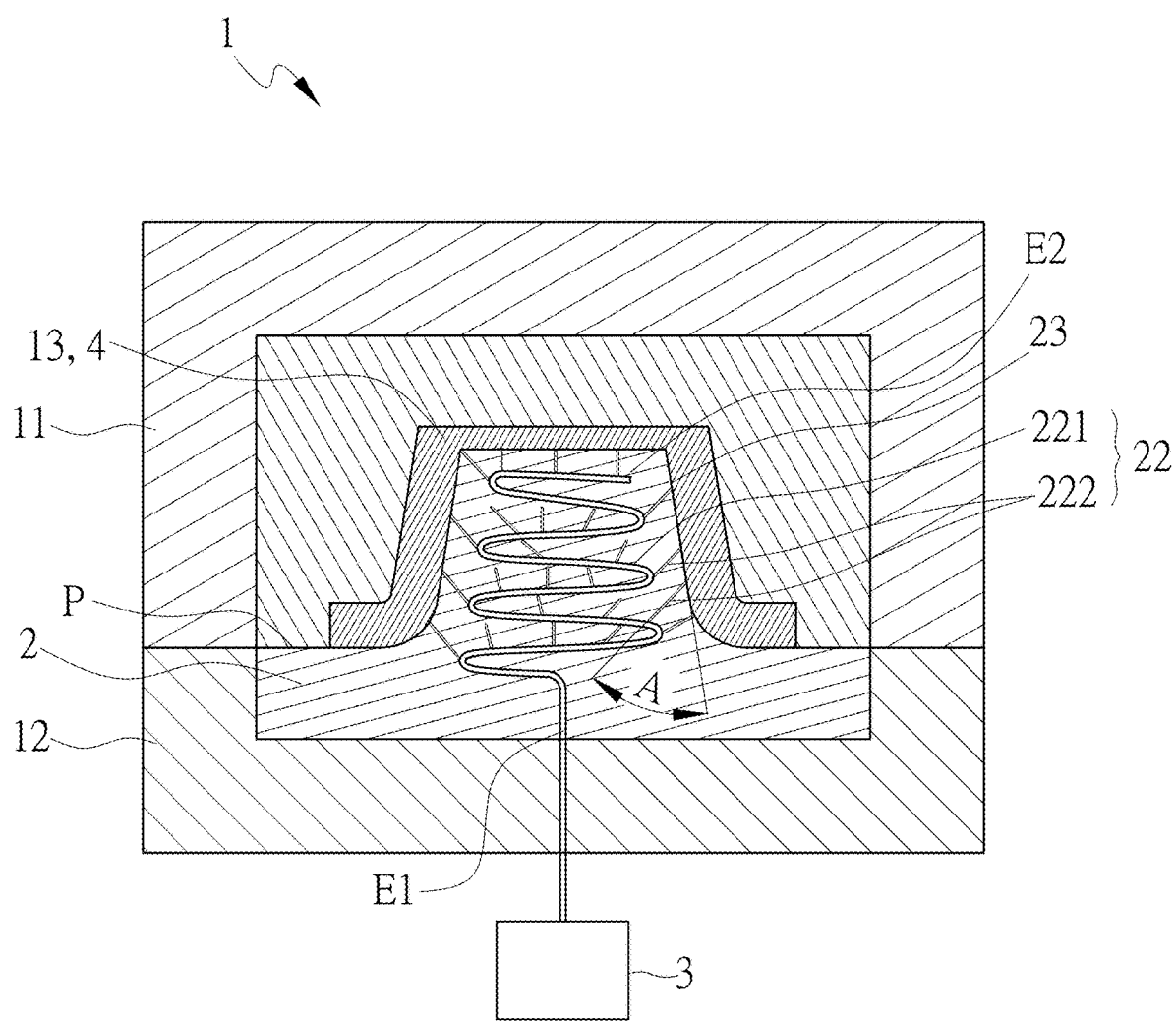
FIG. 2 is a schematic diagram showing a mold core body of the present disclosure arranged in a mold.

Please refer to FIGS. 1 and 2, which show a mold core structure according to a preferred embodiment of the present disclosure. The mold core is arranged in a mold 1. The mold 1 includes a first mold base 11 and a second mold base 12. The mold core structure mainly includes a mold core body 2. The mold core body is embedded in the second mold base 12, but not limited thereto, and can also be embedded in the first mold base 11. Alternatively, according to structural requirements, the first mold base 11 and the second mold base 12 can each be embedded with a mold core body 2 of the present disclosure. The following descriptions and drawings take the mold core body 2 embedded in the second mold base 12 as an example. Certainly, there are other functional structures in the mold 1. Since other functional structures are not within the scope of the present disclosure, they are not shown in the drawings.

Referring to FIGS. 1 and 2, which show a first embodiment of the present disclosure. The mold core body 2 is a solid body made of three-dimensional printing, and its material is preferably a metal material with hard hardness and not easy to rust such as tool steel, martenstitic steel, stainless steel, pure titanium and titanium alloys . . . etc. One side of the mold core body 2 is a parting surface P. The parting surface P is provided with a molding part 23. The molding part 23 has the structural features of a finished product, and the structural features can be used to form a cavity 13 with the inside of the first mold base 11 of the mold 1.

The inside of the mold core body 2 is provided with a conformal air duct 22. The conformal air duct 22 has at least one main air duct 221 and a plurality of secondary air ducts 222. The dashed arrows in FIG. 1 are schematic representations of the secondary air ducts 222. The main air duct 221 has a first end E1 and a second end E2. The first end E1 is located on one side of the mold core body 2 and connected to an external pneumatic control device 3. The second end E2 is located at a predetermined position inside the mold core body 2. The path of the main air duct 221 is freely wound around the molding part 23 between the first end E1 and the second end E2 according to the shape and structure of the finished product. Additionally, the distance H from the molding part 23 varies according to the change of the shape of the finished product 4. The path may be regular, irregular or a combination thereof. For example, the main air duct 221 in FIG. 1 is represented by a spiral shape, and the main air duct 221 in FIG. 2 is represented by a continuous hairpin turn shape. In addition, the quantity of each of the secondary air ducts 222 is increased or decreased according to the shape and structure of the finished product 4. On end of each of the secondary air ducts 222 is communicated with the main air duct 221. Another end of each of the secondary air ducts 222 is communicated with the molding part 23, and arranged towards an ejection direction of the finished product 4. The ejection direction forms an angle A with the surface of the molding part 23. The angle A is mainly used to assist the demolding of the finished product 4. Accordingly, the angle A will define the required angle A according to the features of the finished product 4. Additionally, each of the secondary air ducts 222 is arranged at intervals, and its path is also regular, irregular or a combination thereof. Each of the secondary air ducts 222 is arranged between the main air duct 221 and the molding part 23. The width W1 of the main air duct 221 is greater than the width W2 of the secondary air duct 222, as shown in FIG. 2. Besides, the present disclosure does not limit the number of main air ducts 221, which can also be plural depending on structural requirements.

Accordingly, before the molten plastic is injected into the cavity 13, the pneumatic control device 3 extracts the air inside the cavity 13. Through each of the secondary air ducts 222 and the main air duct 221, the air is discharged to the outside of the mold 1 such that the air inside the cavity 12 can be exhausted as much as possible after the mold is closed and before the molten plastic is injected, thereby reducing the flow resistance after the molten plastic is injected. The molten plastic is allowed to flow to the end of the cavity 13 so as to solve the problem of lack of material at the end of the finished product 4 and the problems that the plastic flow envelops the air to cause the finished product to produce voids or bubbles, shrinkage, depressions, cracks, charring and others. When the finished product is waiting to be cooled down in the cavity 13, by means of the pneumatic control 3, the air is diffused through the conformal air duct 22 so as to adjust the temperature of the mold core body 2 and shorten the cooling time of the finished product 4. At the same time, the present disclosure solves the problem that the conventional cooling water channel cannot reach the dead corner or heat accumulation area of the finished product. When the first mold base 11 is separated from the second mold base 12, by means of the control of the pneumatic control device 2, the air is ejected from the main air duct 221 and then through each of the secondary air ducts 222. Since the width W2 of the main air duct 221 is greater the width W2 of each of the secondary air ducts 222, under the pressure output by the pneumatic control device 2, the air flow from the large pipe diameter to the smaller pipe diameter will form the effect of pressurized ejection such that the finished product 4 is separated from the mold core body 2, and the demolding process is completed.

Therefore, compared with the space required for inlaying the air pins of the prior art, the present disclosure prints the conformal air duct 22 in three dimensions. Each of the secondary air ducts 222 can be evenly distributed in the mold core body 2 so as to increase the contact area between the air and the finished product 4 and reduce the output of air pressure. In addition, the width W2 of each of the secondary air ducts 222 is changed according to the structure of the finished product 4. The permeated air is ejected from each of the secondary air ducts 222 such that the finished product 4 can be demolded, thereby reducing the problem that the finished product is prone to uneven marks or spray marks.

Figure 3:
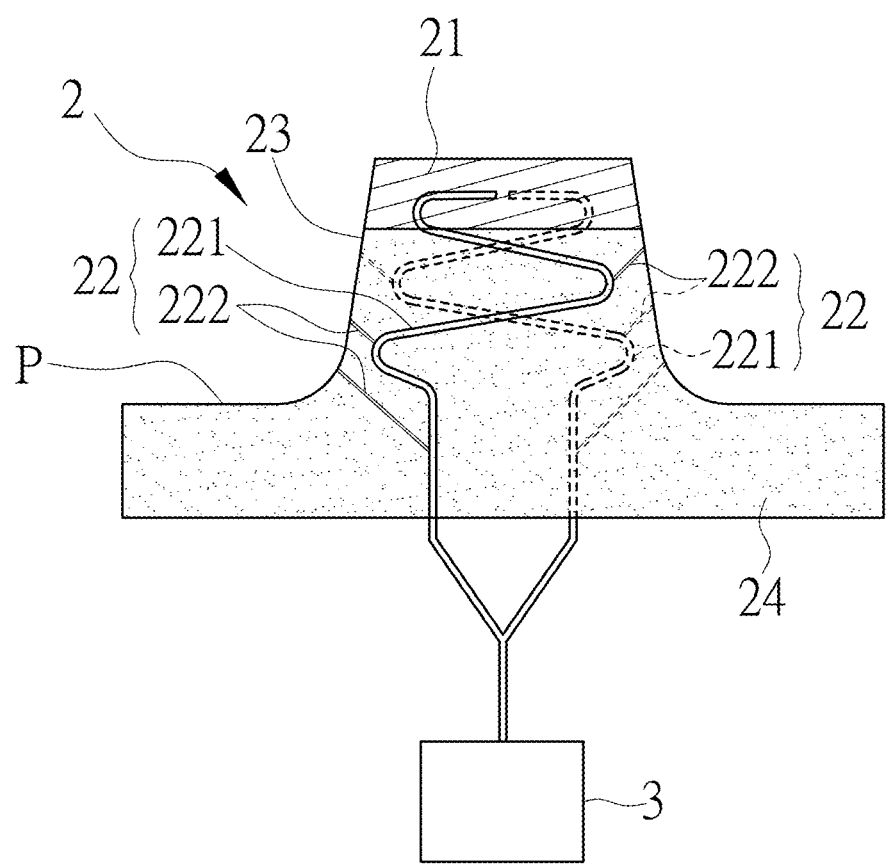
FIG. 3 is a schematic plan view showing a second embodiment of the present disclosure.
Figure 4:
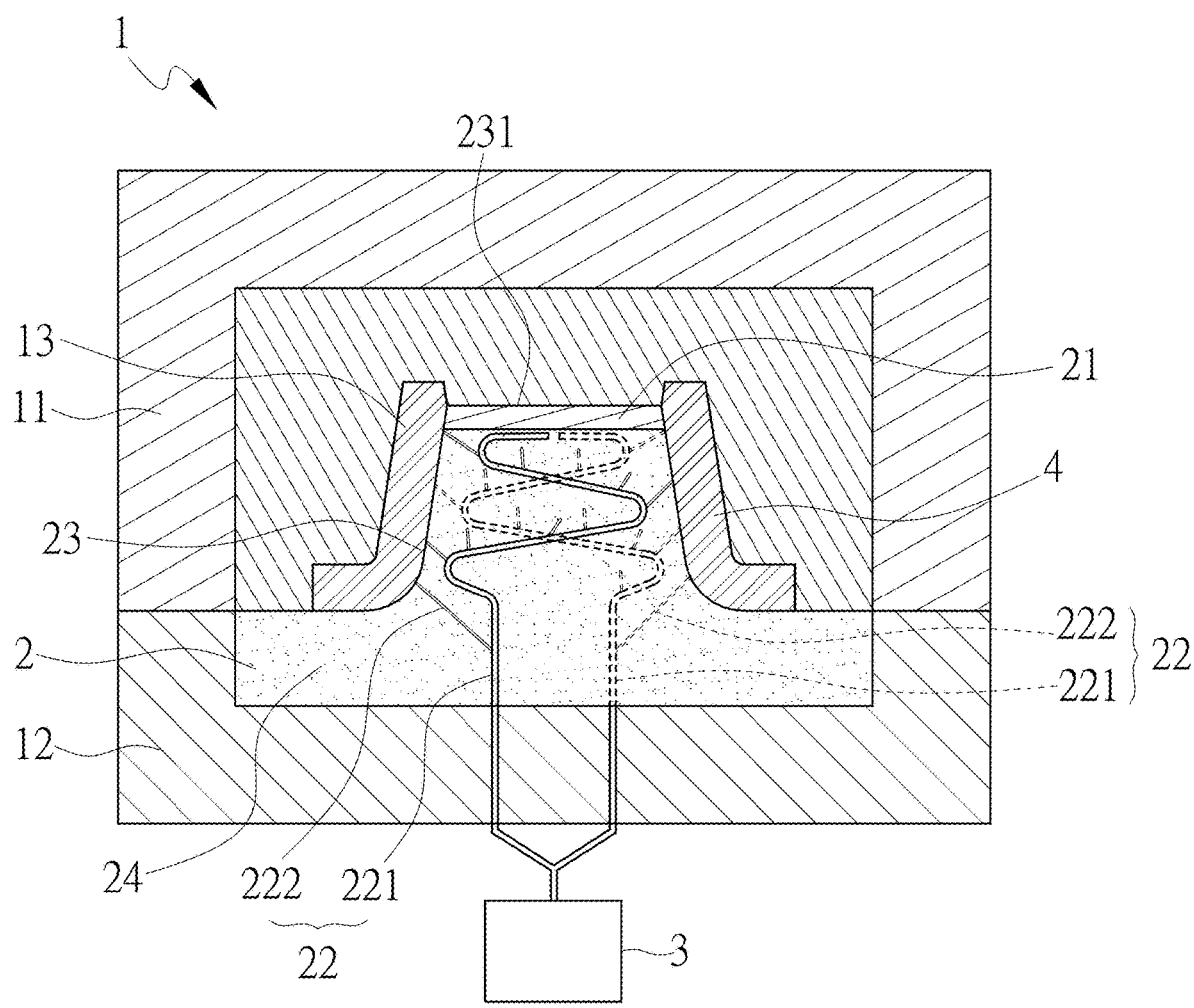
FIG. 4 is a schematic diagram showing the second embodiment of the present disclosure arranged in a mold.
Figure 5:
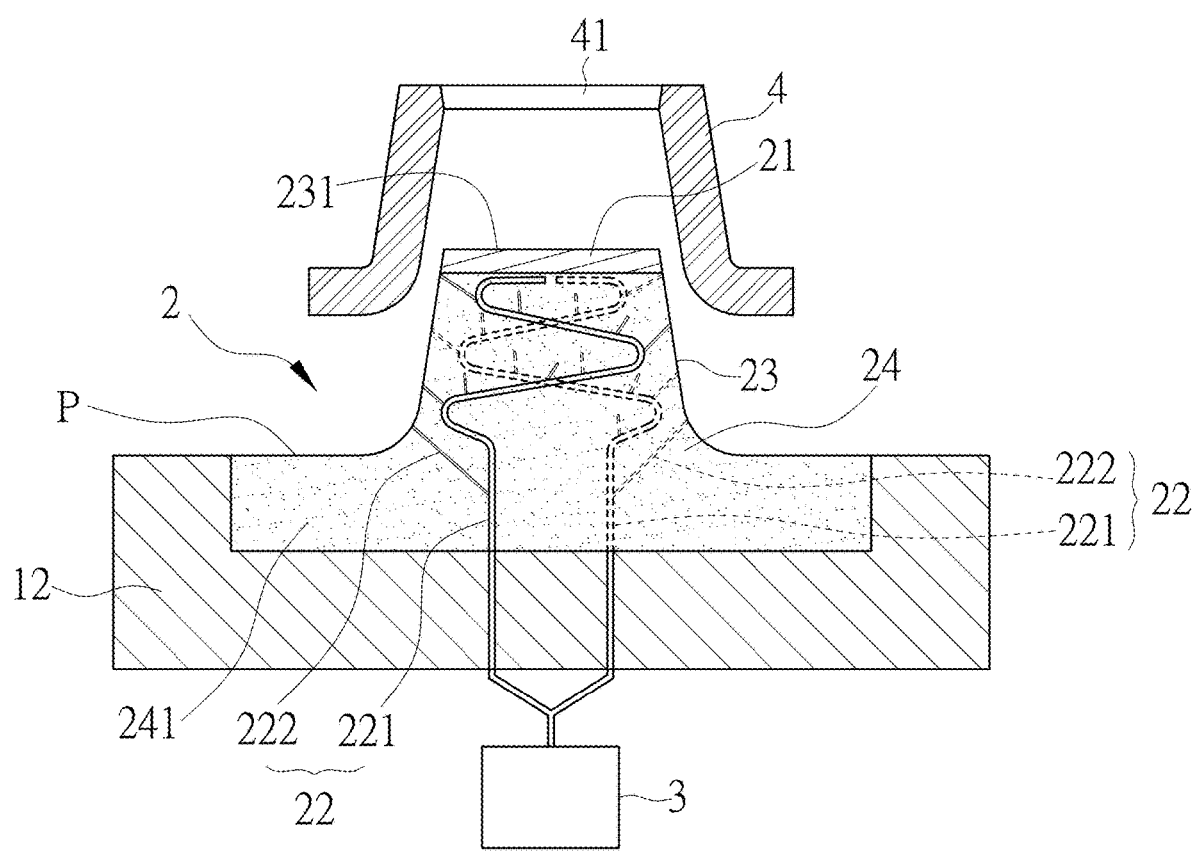
FIG. 5 is a schematic diagram showing a finished product of FIG. 4 being released from the mold according to the present disclosure.

Please refer to FIG. 3 to FIG. 5, which show a second embodiment of the present disclosure according to the above-mentioned structural change. The same structure will not be repeated, and only the structural differences are described below. In the embodiment of the present disclosure, the mold core body 2 includes a solid zone 21 and an air-permeable zone 24. The solid zone 21 and the air-permeable zone 24 are integrally made by three-dimensional printing. The solid zone 21 is a solid body, and the three-dimensional printing filling density of the air-permeable zone 24 is lower than the filling density of the solid zone 21 such that the air-permeable zone 24 is provided with interconnected micropores 241. The micropores 241 in the drawings are represented by dots, and the range of the molding part 23 includes the solid zone 21 and the air-permeable zone 24. The surrounding range of the conformal air duct 22 includes the air-permeable zone 24 and the solid zone 21. Alternatively, the surrounding range of the conformal air duct 22 only includes the air-permeable zone 24. The conformal air duct 22 is communicated with the micropores 241 of the air-permeable zone 24. FIG. 3 shows that the conformal air duct 22 of the mold core body 2 has a plurality of main air ducts 221 and a plurality of secondary air ducts 222. The path of each of the main air ducts 221 is arranged around the air-permeable zone 24 and the solid zone 21 as an example to illustrate. In the embodiment of the present disclosure, the main air ducts 221 are misaligned with each other but do not intersect with each other. FIG. 3 is only for illustration and not used to limit its detouring path. The first ends of each of the main air ducts 221 are jointly connected to an external pneumatic air control device 3. Alternatively, a main air duct 221 can be connected to a pneumatic air control device 3 such that each pneumatic control device 3 can control the connected main air duct 221. Each of the secondary air ducts 222 is respectively communicated between each of the main air ducts 221 and the molding part 23, and one end of the communicating molding part 222 is arranged towards an ejection direction of the finished product 24.

Please also refer to FIGS. 4 and 5, which show an embodiment in which each of the main air ducts 221 is arranged around the air-permeable zone 24. In the embodiment of the present disclosure, the molding part 23 has a shut-off zone 231. The shut-off zone 231 corresponds to the shut-off hole 41 or the insertion hole on the finished products 4, and the range of the solid zone 21 includes the shut-off hole 231. As such, before the molten plastic is ejected, the pneumatic control device 3 will vacuum the cavity 13. The air in the cavity 13, each of the main air ducts 221, each of the secondary air ducts 222 and the micropores 241 is evacuated as much as possible. However, after the air is extracted and the molten plastic is injected into the cavity 13, the air existing in the injection machine (not shown), the air generated by the decomposition of the molten plastic at high temperature or the air generated by the chemical reaction . . . etc. can be exhausted into the micropores 241 of the air-permeable zone 24 and into each of the main air ducts 221 and each of the secondary air ducts 222 such that the air generated curing the molding process can be exhausted smoothly.

When the molten plastic is injected into the cavity 13 to wait for cooling, the pneumatic control device 2 can switch the air to enter from the main air duct 221 and diffuse out through the micropores 241 of the air-permeable zone 24 so as to adjust the temperature of the mold core body 2, thereby shortening the cooling time of the finished product 4. At the same time, the present disclosure solves the problem that the conventional cooling water channel cannot reach the dead corner or heat accumulation area of the finished product. In addition, when the first mold base 22 is separated from the second mold base 12, the air is controlled to be ejected from each of the secondary air ducts 222 and the micropores 241 such that the finished product 4 is enabled to complete the demolding process, and the range of the solid zone 21 includes the shut-off zone 231. Consequently, the air can be blocked by the solid zone 21 to prevent the air from escaping from the shut-off zone 231 and affecting the demolding process.

It is worth mentioning that when the finished product is a material with high viscosity, such as thermoplastic rubber material (TPR), rubber, thermoplastic polyurethane (TPU), silicone rubber, etc., the surface will stick to the mold after cooling, thereby increasing the difficulty of demolding. Since the mold core body 2 of the present disclosure has an air-permeable zone 24, when the pneumatic control device 2 switches the air entering from each of the main air ducts 221 and diffusing out through the micropores 241 of the air-permeable zone 24, in addition to shortening the cooling time of the finished product 4, at the same time, the finished product 4 with high material viscosity can be separated from the surface of the finished product 4 and the surface of the cavity 13 by the air diffused by the micropores 241 so as to improve TPR, rubber, TPU silicon . . . , etc.

Figure 6:
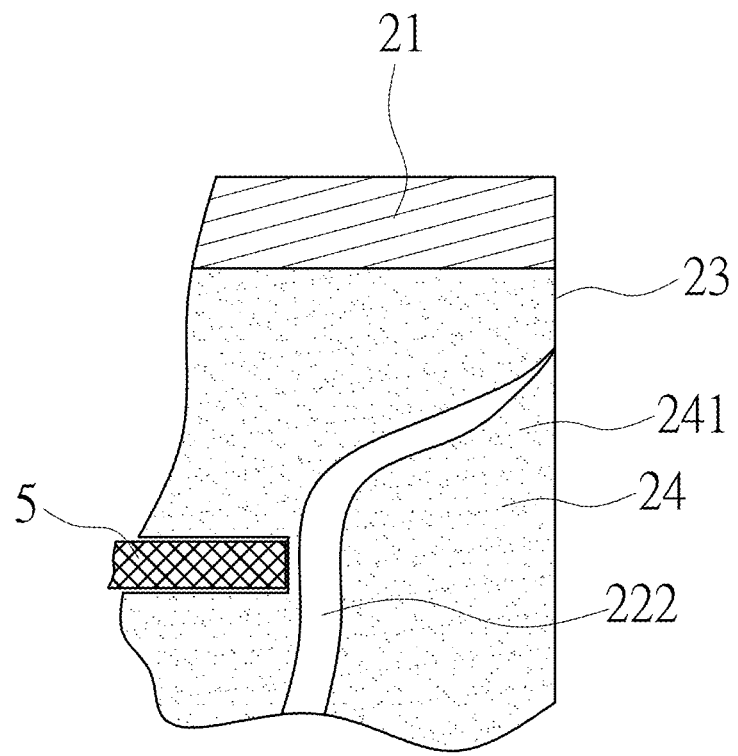
FIG. 6 is a schematic diagram showing an embodiment of a secondary air duct according to the present disclosure.
Figure 7:
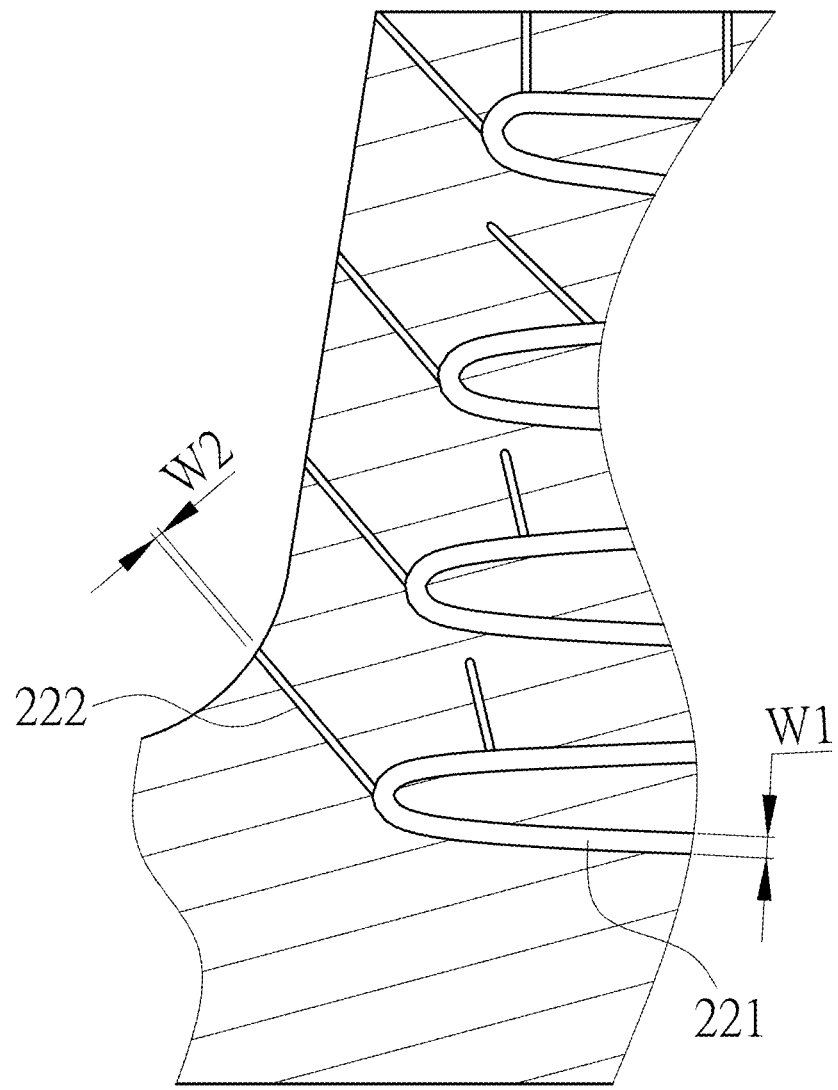
FIG. 7 shows a partial enlarged view of FIG. 2 according to the present disclosure.

As mentioned above, in order to further enhance the force of the air ejection, as shown in FIG. 6, one end of each of the secondary air ducts 222 toward the molding part 23 is tapered, thereby allowing the air to have a pressurizing effect when entering the end of each of the secondary air ducts 222. At the same time, the mold core body 2 can be further provided with a temperature controller 5 adjacent to each of the secondary air ducts 222. The temperature controller 5 can be a heater or a cooler, thereby allowing the air to exchange heat and cold with the temperature emitted by the temperature controller 5 and adjusting the air to a better temperature for demolding.

To sum up, compared with the prior art, the mold core structure of the present disclosure has the following advantages of: 1. Reducing the traces and unevenness of the finished product due to ejection; 2. Solving all kinds of air-envelope problems, such as lack of material at the end of the cavity, air surrounded by plastic flow, resulting in voids or air bubbles in the finished product, shrinkage depressions, cracks, scorching, etc.; 3. making the materials with high viscosity (silicone, rubber) not stick to the mold, thereby demolding smoothly; and 4. Controlling the temperature in the mold such that the mold core does not accumulate heat in each process so as to obtain reproducibility, improve the yield of finished products and reduce energy consumption.

Although the present disclosure has been described with reference to the preferred exemplary preferred embodiments thereof, it is apparent to those skilled in the art that a variety of modifications and changes may be made without departing from the scope of the present disclosure which is intended to be defined by the appended claims.

What is claimed is:

1. A mold core structure, which is arranged on a mold, the mold core structure comprising:
   a mold core body, which is a solid body made by three-dimensional printing, wherein one side of the mold core body is provided with a molding part, which is combined with an internal structure of the mold to form a cavity, there is a conformal air duct inside the mold core body, the conformal air duct has at least one main air duct and a plurality of secondary air ducts, the main air duct has a first end and a second end, the first end is located on one side of the mold core body, and connected to an external pneumatic control device, the pneumatic control device controls air to enter or exit the cavity through the conformal air duct, the second end thereof is located inside the mold core body, a path of the main air duct is freely wound within the molding part between the first end and the second end, one end of each of the secondary air ducts is communicated with the main air duct, and another end thereof is communicated with the molding part and disposed towards an ejection direction of a finished product.

2. The mold core structure of claim 1, wherein one end of each of the secondary air ducts toward the molding part is tapered.

3. The mold core structure of claim 1, wherein the mold core body is provided with a temperature controller adjacent to each of the secondary air ducts.

4. The mold core structure of claim 1, wherein the mold core body is made of metal material with high hardness and rust resistance.

* * * * *